United States Patent [19]

Camprincoli

[11] 4,425,402

[45] Jan. 10, 1984

[54] FIBRILLATED POLYMERIC FILMS AS REINFORCEMENT IN MANUFACTURED ARTICLES BASED ON HYDRAULIC BINDERS

[75] Inventor: Pierpaolo Camprincoli, Terni, Italy

[73] Assignee: Montedison S.p.A., Milan, Italy

[21] Appl. No.: 348,776

[22] Filed: Feb. 16, 1982

[30] Foreign Application Priority Data

Feb. 17, 1981 [IT] Italy ................................ 19797 A/81

[51] Int. Cl.³ ............................ B32B 5/16; B29H 9/02
[52] U.S. Cl. ..................................... 428/330; 428/255; 428/325; 428/703; 428/701; 428/516; 428/461
[58] Field of Search ............... 428/461, 703, 701, 330, 428/325, 516, 255

[56] References Cited

U.S. PATENT DOCUMENTS

| | | | |
|---|---|---|---|
| 3,844,865 | 10/1974 | Elton et al. | 428/330 X |
| 4,265,960 | 5/1981 | Arbit et al. | 428/330 X |
| 4,297,409 | 10/1981 | Hannant | 428/255 X |
| 4,344,910 | 8/1982 | Bijen | 428/255 X |
| 4,348,445 | 9/1982 | Craig | 428/255 X |

FOREIGN PATENT DOCUMENTS 1582945 1/1981 United Kingdom .

*Primary Examiner*—Patricia C. Ives

[57] ABSTRACT

Fibrillated polymeric films, having a netlike structure, containing incorporated therein from 1 to 30% by weight of a car bonate of an alkaline-earth metal, are utilized as reinforcement in the manufacture of articles based on hydraulic binders.

4 Claims, No Drawings

FIBRILLATED POLYMERIC FILMS AS REINFORCEMENT IN MANUFACTURED ARTICLES BASED ON HYDRAULIC BINDERS

BACKGROUND OF THE INVENTION

It is known, from British Pat. No. 1,037,741, to prepare flat or tubular net-shaped structures consisting of longitudinally oriented interlaced synthetic polymers, by producing, with the help of suitable cutting devices, a series of spaced, parallel slots in either a flat or tubular, mono-oriented polymer film, so that the successive transversal expansion of the slitted film will produce the net-like structure.

Net-shaped structures of an analogous type, although consisting of filaments interlaced in a much more irregular and casual manner, may be obtained, furthermore, by disaggregation or by slitting of the mono-oriented polymeric films by different methods, such as, for instance, by sandblasting, brushing or rubbing.

In general, the products thus obtained are bulky and flexible, and are used for manufacturing ropes, cords and strings and textile materials of various kinds.

It is also known, from Spanish Pat. No. 460,292, to use structures of that kind, opened by transversal or cross-expansion, in manufactured products based on inorganic hydraulic binders, in order to obtain an improvement of their mechanical characteristics.

Given the chemical incompatibility of the synthetic polymers in general for the inorganic materials that form the hydraulic binders, the polymeric structures thus used hardly adhere to the matrix of the binder, wherefore the reinforcing action is not altogether effective.

In British Pat. No. 1,316,661, there is described a process aimed at improving the characteristics of the manufactured products made of hydraulic binders, by means of a reinforcement with synthetic polymeric fibers additioned with 20-80% of cements. In such a case the fibers are of the conventional type with a high count (greater than 50 denier), and are cut into 50-30 mm long staples.

Similar fibrous compositions, to be used as reinforcement of manufactured products from hydraulic binders, are also claimed in published Japanese patent application No. 74/48.721. The use of this kind of reinforcement causes problems in the production of the fibers with regard to the high percentage of additive present, and does not allow to obtain manufactured products from hydraulic binders that will have satisfactory characteristics. More particularly, the resistance to bending of the reinforced manufactured products is only slightly higher than that of the non-reinforced products.

THE PRESENT INVENTION

One object of this invention is to provide fibrillated films or flat net-like structures of synthetic polymers, containing incorporated therein from 1 to 30% by weight of carbonates of alkaline-earth metals, in particular of calcium carbonate.

It is another object of the present invention to provide a process for preparing such films or structures.

Preferably, the fibrillated films or the flat net-like structures according to this invention have a surface area of at least 0.2 m$^2$/g, more preferably ranging from 0.25 to 1.3 m$^2$/g. They may consist of any stretchable film-forming synthetic polymer, such as, for example, polyolefins, polyamides, vinyl polymers, polyester resins and mixtures of such polymers, and in particular the olefinic polymers prepared with stereospecific catalysts, such as the polypropylene having prevailingly isotactic macromolecules, the polyethylene, the ethylene-propylene crystalline copolymers containing prevailingly propylene, both of the statistic and of the block type, or mixtures thereof.

The mixtures of polypropylene with up to 20% by weight, referred to the mixture, of low-density polyethylene and/or of ethylene-propylene copolymers have proved particularly advantageous for preparing the structures according to this invention.

The carbonates of alkaline-earth metals to be employed according to the present invention are preferably the calcium, strontium, barium and magnesium carbonates.

A preferred method of preparing the structures according to the invention comprises, in the order, the following steps:

(a) preparing a mixture of at least an orientable and film-forming synthetic polymers, with 1-30% by weight, in respect of such mixture, of a carbonate of an alkaline-earth metal in powder, and optionally, but not necessarily, with 0.05-0.5% by weight of an expanding or swelling agent;

(b) transforming the mixture into a flat or tubular film;

(c) orienting such film in the longitudinal or prevailingly longitudinal direction, by mechanical stretching, with stretch ratios from 1:3 to 1:15, so obtaining an oriented film having a thickness between 20 and 200 microns;

(d) fibrillating the oriented film.

Some examples of expanding agents employable in the mixture as per step (a) are: azodicarbonamide, azo-bis-isobutyronitrile, dinitro-isopentamethylene-tetramine, sodium bicarbonate and the like.

The preparation of the film from the mixture of polymer and carbonate of an alkaline-earth metal may be accomplished according to conventional modalities, such as, for example, extrusion and casting.

Film orientation step (c) may be carried out by heat stretching between slow rolls and fast rolls.

Fibrillation of the oriented film is achieved by means of slitting, which is preferably accomplished by conveying the film on surfaces equipped with slitting devices, such as blades, needles and the like, according to the methods described in British Pat. No. 1,073,741.

High values of surface area are attainable through such slitting operation, preferably by subjecting the film, prior to slitting, to additional treatments such as surface abrasion with brushes, sandblasting etc.

Methods useful to such purpose are described, for example in European patent publication No. 21017, published on Jan. 7, 1981, in the name of Montedison and Moplefan.

Once obtained, the fibrillated films, or net-like structures of the present invention may be made wettable by oxidizing surface treatments, such as the known flame treatments or the ones with high-frequency discharges, and also dimensionally stabilized.

The fibrillated films or net-like structures of the present invention may be in the form of individual elements, or in the form of packs of packs of more fibrillated films reciprocally superposed according to various arrangements, in which the individual films are either free in respect of one another, or welded to one another.

Such structures may be used as a reinforcement in any types of inorganic hydraulic binders, such as, for example, Portand cements, aluminous cements, hydraulic limes, calcium sulphate.

Variations and modifications may be brought to the present invention when practicing same, without departing however from the spirit and the scope of the invention itself.

The following examples are given to illustrate the present invention, without being, however, a limitation thereof.

EXAMPLE 1

A mixture was prepared by mixing, in a Battagion mixer having a capacity of 100 l, the following products:

| | |
|---|---|
| polypropylene in flakes (melt index = 10; ashes = 75 ppm; residue of the extraction with heptane = 97.5%) | 35 Kg |
| low density polyethylene | 3 Kg |
| calcium carbonate | 2 Kg |

The resulting mixture was granulated at 210° C. and the granule was extruded to provide a flat film. The film was stretched in the longitudinal direction, in a stretching ratio of 1:10, at a temperature of 130° C. The thickness of the stretched film was of 60 microns.

The mono-axially stretched film was slitted by conveying it on a fibrillating roll equipped with needles. The resulting fibrillated film exhibited a surface area of 0.25 m$^2$/g determined by absorption of gaseous krypton.

The net-like structure so obtained was opened, according to an opening ratio of 1.12.

Now the open net-like structure was dimensionally stabilized by means of heat-treatment at a temperature of 125° C. for 5 minutes. Composite plates were then prepared by alternating layers of such reticular structures with layers of Portland 325 cement mixed with water in a water/cement weight ratio of 0.35/1, by using 110 nets (with a reticular structure/cement ratio by volume of 9/91), allowing such plates to stand for 24 hours, and then allowing them to cure for 28 days, at 25° C.

The three-point flexural strength determined on specimens cut from such plates according to the direction of orientation of the films, measured according to standards UNI-3948, was of 350 kg/cm$^2$.

EXAMPLE 2

It was operated as in example 1, except that the starting mixture contained 33 kg of polypropylene and 4 kg of calcium carbonate, besides 3 kg of low density polyethylene, and that the fibrillated film exhibited a surface area of 0.3 m$^2$/g.

The three-point flexural strength, on specimens cut from composite plates according to the direction of orientation of the films, determined according to standards UNI-3948, was of 360 kg/cm$^2$.

EXAMPLE 3

A mixture was prepared by mixing, in a Battagion mixer having a 100-liter capacity, the following products:

| | |
|---|---|
| polypropylene in flakes (melt index = 10; ashes = 75 ppm; residue of the extraction with heptane = 97.5%) | 35 kg |
| low density polyethylene | 3 kg |
| calcium carbonate | 2 kg |
| azodicarbonamide (expanding agent) | 0.1 kg |

The mixture was extruded to obtain a flat film. The film was stretched in the longitudinal direction, according to a stretching ratio of 1:8 at a temperature of 130° C. The thickness of the stretched film was of 60 microns.

The mono-axially stretched film was slitted by conveyance on a fibrillating roll equipped with needles. A fibrillated film was so obtained, which exhibited a surface area of 0.35 m$^2$/g, determined by absorption of gaseous krypton. The net-like structure so formed was opened, the opening ratio being 1:12.

The open reticular structures were then dimensionally stabilized by means of heat-treatment at a temperature of 125° C. for 5 minutes.

Composite plates were then prepared by alternating layers of reticular structures with layers of Portland cement 325 mixed with water in a water/cement ratio by weight of 0.3/1, employing 100 nets (the reticular structure/cement ratio by volume being 9/91), allowing them to stand for 24 hours, and then allowing them to cure for 28 days at 25° C. The three-point flexural strength determined on specimens cut from such plates according to the direction of orientation of the film, conforming to UNI-3948, was of 360 kg/cm$^2$.

EXAMPLE 4

A mixture was prepared by mixing, in a Battagion mixer having a capacity of 100 l, the following:

| | |
|---|---|
| polypropylene in flakes (melt index = 10; ashes = 75 ppm; residue of the extraction with heptane = 97.5%) | 35 kg |
| low density polyethylene | 3 kg |
| barium carbonate | 2 kg |

From such mixture, by operating according to example 1, a fibrillated film was prepared, which, after opening according to a ratio of 1:9 and dimensional stabilization, was utilized for preparing composite cement plates. such plates were obtained by alternating layers of reticular structures with Portland cement 325, mixed with water in a water/cement ratio by weight of 0.3/1, employing 120 nets (reticular structure/cement ratio by volume=8/92), allowing them to stand for 24 hours, and then allowing to cure for 28 days, at 25° C.

The three-point flexural strength of the plates, measured on specimens cut along the reinforcement direction, according to standard UNI-3948, was of 345 kg/cm$^2$.

What we claim is:

1. Manufactured articles based on hydraulic binders containing fibrillated films, or net-like flat structures, of at least one orientable film-forming synthetic polymer as reinforcement, said fibrillated films or net-like structures having incorporated therein from 1 to 30% by weight of at least one carbonate of an alkaline-earth metal.

2. Manufactured articles according to claim 1, in which the synthetic polymer is polypropylene.

3. Manufactured articles according to claim 1, in which the synthetic polymer consists of a mixture of polypropylene with up to 20% by weight of low density polyethylene.

4. Manufactured articles according to claim 1, in which the carbonate of an alkaline-earth metal is selected from the group consisting of the carbonates of calcium, barium, strontium and magnesium.

* * * * *